United States Patent
Iwasaki et al.

(10) Patent No.: US 7,070,856 B2
(45) Date of Patent: Jul. 4, 2006

(54) FRONT FACE ERASABLE MICROCAPSULE MAGNETOPHORETIC DISPLAY SHEET, ERASING MAGNET AND WRITING MAGNET

(75) Inventors: Takashi Iwasaki, Hanno (JP); Takuya Yashuhara, Iruma (JP); Kenji Nonaka, Tama (JP); Sadatoshi Igaue, Tachikawa (JP)

(73) Assignees: A-Son Enterprise, Inc., Tokyo (JP); Tocom Corporation, Tokyo (JP)

( * ) Notice: Subject to any disclaimer, the term of this patent is extended or adjusted under 35 U.S.C. 154(b) by 0 days.

(21) Appl. No.: 10/323,181

(22) Filed: Dec. 18, 2002

(65) Prior Publication Data

US 2003/0170457 A1    Sep. 11, 2003

(30) Foreign Application Priority Data

Dec. 25, 2001    (JP)    ............................. 2001-392561

(51) Int. Cl.
*B32B 15/02*    (2006.01)
(52) U.S. Cl. .................. 428/323; 428/327; 428/402.2; 428/403; 428/900; 434/409
(58) Field of Classification Search ................ 428/323, 428/900, 402.2, 32.7; 434/409
See application file for complete search history.

(56) References Cited

U.S. PATENT DOCUMENTS

| | | | | |
|---|---|---|---|---|
| 4,143,472 A | * | 3/1979 | Murata et al. | 434/409 |
| 5,332,488 A | * | 7/1994 | Mitsuji | 205/181 |
| 6,275,130 B1 | * | 8/2001 | Yoshimura et al. | 335/302 |
| 6,450,401 B1 | * | 9/2002 | Hirota et al. | 235/61 R |
| 6,562,289 B1 | * | 5/2003 | Staubach et al. | 419/26 |

* cited by examiner

*Primary Examiner*—Monique R. Jackson
(74) *Attorney, Agent, or Firm*—Brouse McDowell; Roger D. Emerson; Daniel A. Thomson

(57) ABSTRACT

Disclosed herein is a front face erasable microcapsule magnetophoretic display sheet having a support and a solid dispersion layer provided on one surface of the support and composed of microcapsules having an average particle diameter of 50 to 650 µm, in which a liquid dispersion, a white pigment, additives and magnetic particles are encapsulated, and a binder. The magnetic particles include at least two kinds of magnetic particles different in particle diameter from each other. An erasing magnet for front face erasing and a writing magnet for front face erasable microcapsule magnetophoretic display sheet are also disclosed.

23 Claims, 6 Drawing Sheets

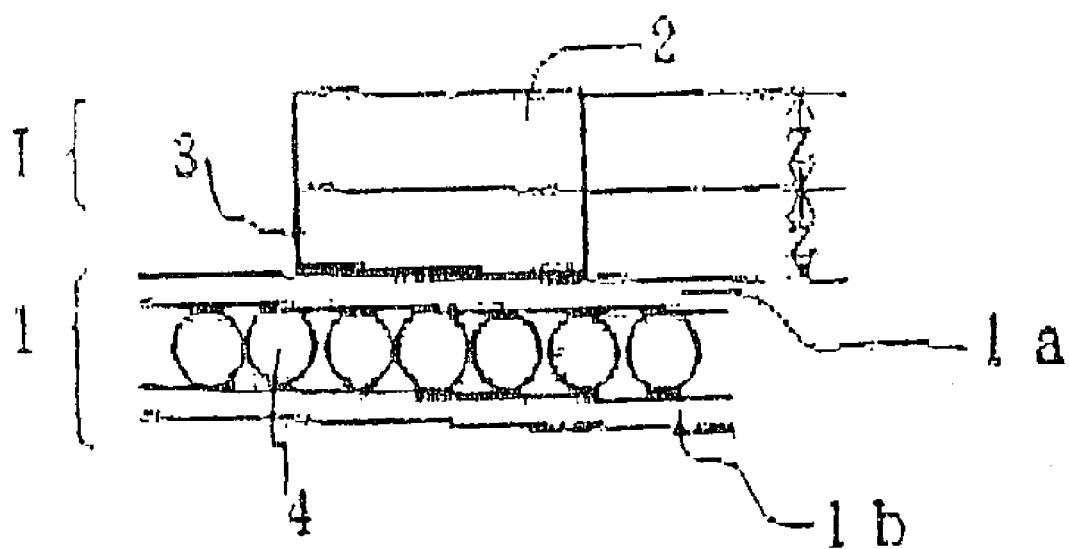

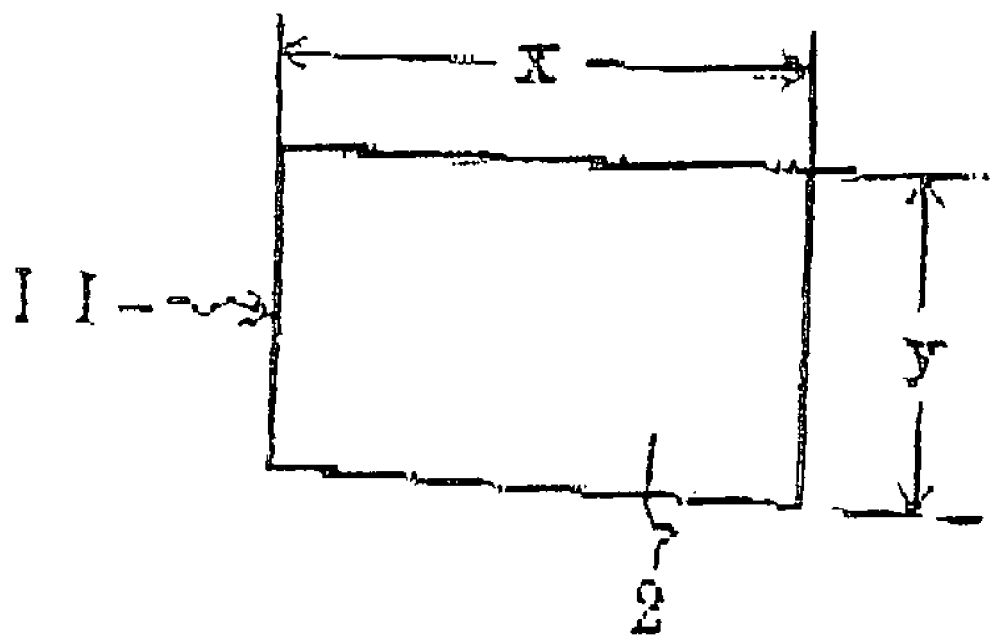

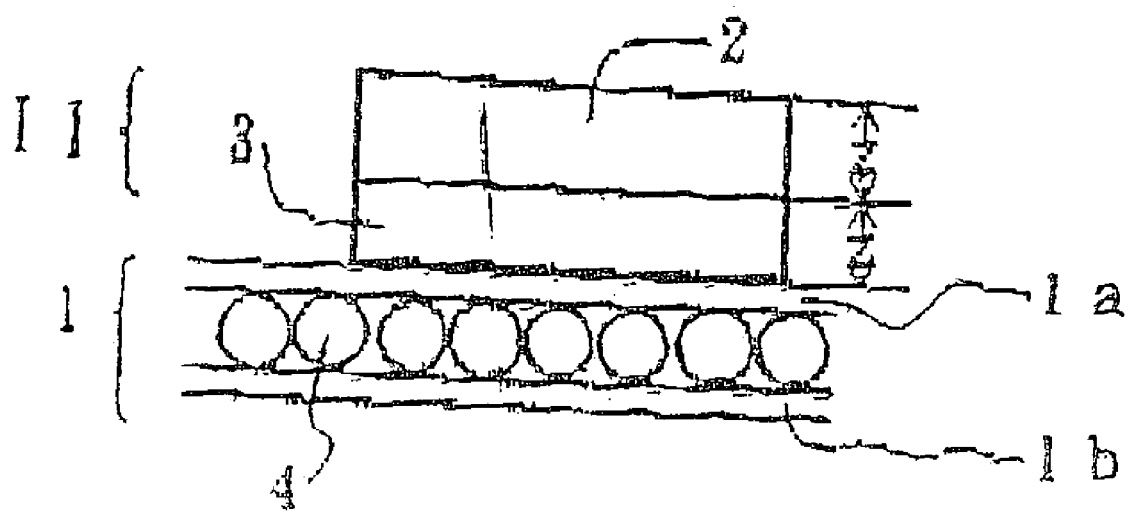

FRONT FACE ERASABLE MICROCAPSULE MAGNETOPHORETIC DISPLAY SHEET, ERASING MAGNET AND WRITING MAGNET

BACKGROUND OF THE INVENTION

This application claims priority to Japanese patent application no. 2001-392561 filed on Dec. 25, 2001.

1. Field of the Invention

The present invention relates to a front face erasable microcapsule magnetophoretic display sheet, an erasing magnet and a writing magnet for the sheet, and particularly to a front face erasable microcapsule magnetophoretic display sheet, by which a magnetic record magnetically recorded on the front face of the sheet can be erased wholly or partially from the front face side thereof by a magnet, an erasing magnet which can erase a record from the front face side of a recorded sheet, and a writing magnet for the sheet.

2. Related Background Art

There has heretofore been known a magnetic recording system that a magnetic recording is conducted on the front face of a microcapsule magnetophoretic display sheet. This magnetic recording system is generally a system wherein an erasing magnet is slid across the whole rear face of the microcapsule magnetophoretic display sheet to make the front face thereof clean. Writing is then conducted on the front face with a writing magnet or magnet pen to obtain a magnetic record, and the magnetic record recorded thereon is optionally erased from the rear face side by sliding an erasing magnet across the whole rear face thereof. When such a magnetic record is erased, the erasing magnet is slid across the rear face of the microcapsule magnetophoretic display sheet, thereby erasing the record recorded on the front face of the magnetophoretic display sheet. According to an erasing method heretofore used, however, the magnetically recorded display recorded on the microcapsule magnetophoretic display sheet is erased entirely by the erasing magnet when the erasing is conducted from the rear face side. Therefore, erasing only a desired portion of the magnetically recorded display cannot be accomplished, which is very inconvenient. The uses thereof are thus limited.

SUMMARY OF THE INVENTION

Partially erasing characters, diagrams and/or the like magnetically recorded from the front face side under the foregoing circumstances, to say nothing of the whole surface erasing, not only eliminates such inconvenience as described above, and makes the microcapsule magnetophoretic display sheet easy to use, but also the sheet can be applied to various uses, for example, chalk boards, and used by attaching it on surfaces of walls, lockers, etc. or for production of machine readable magnetic records and as inspection materials of steel products or the like. The present inventors have paid attention to this regard and continued to carry out various investigations. As a result, it has been found that the microcapsule magnetophoretic display sheet is improved, and the erasing magnet and the writing magnet or magnet pen is devised, whereby printing of recorded characters and the like or erasing of the print can be partially and easily conducted from the front face of the magnetic display sheet. It is therefore a first object of the present invention to provide a front face erasable microcapsule magnetophoretic display sheet, by which characters, diagrams and/or the like magnetically recorded on the front face of the magnetic recording sheet can be simply and easily erased wholly or partially from the front face side thereof.

A second object of the present invention is to provide an erasing magnet for front face erasing, which has a simple structure and can wholly or partially erase characters, diagrams and/or the like from the recording surface side of a recorded sheet.

A third object of the present invention is to provide a writing magnet for front face erasable microcapsule magnetophoretic display sheets, by which fine characters, diagrams and/or the like can be clearly displayed.

The above objects of the present invention can be achieved by the respective aspects of the present invention described below.

According to the present invention, there is thus provided a front face erasable microcapsule magnetophoretic display sheet comprising a support and a solid dispersion layer provided on one surface of the support and composed of microcapsules having an average particle diameter of 50 to 650 μm, in which a liquid dispersion, a white pigment, additives and magnetic particles are encapsulated, and a binder, wherein the magnetic particles include at least two kinds of magnetic particles different in particle diameter from each other.

In the front face erasable microcapsule magnetophoretic display sheet described above, at least one kind of magnetic particles having a particle diameter ranging from 0.1 μm to 1.0 μm and at least one kind of magnetic particles having a particle diameter greater than the above particles ranging from greater than 1.0 μm to 20 μm may be used as the magnetic particles.

In the front face erasable microcapsule magnetophoretic display sheet described above, the proportion of the magnetic particles may be the sum total of 100% by weight of said at least one kind of magnetic particles having a particle diameter ranging from 0.1 μm to 1.0 μm and 10 to 200% by weight of said at least one kind of magnetic particles having a particle diameter greater than the above particles ranging from greater than 1.0 μm to 20 μm.

In the front face erasable microcapsule magnetophoretic display sheet described above, the support may be a releasing member, and the display sheet is composed of only a support-free solid dispersion layer from which the releasing member has been released and removed.

In the front face erasable microcapsule magnetophoretic display sheet described above, a solvent in the liquid dispersion may be composed of at least one low-boiling solvent selected from the group consisting of toluene, xylene, ethylbenzene, methylcyclohexane, ethylcyclohexane and cyclohexane and at least one high-boiling solvent selected from the group consisting of dodecylbenzene, dipentylbenzene, diphenyl ether, dibenzyl benzoate, phenylxylylethane, diethylbenzene, pentylbenzene, ethyl phthalate and butyl phthalate, and a proportion of the high-boiling solvent to the low-boiling solvent may be 10 to 250 parts by weight per 100 parts by weight of the low-boiling solvent.

According to the present invention, there is also provided an erasing magnet for front face erasing, which is adapted to slide it over at least a part of the front face of a front face erasable microcapsule magnetophoretic display sheet, wherein the magnet is arranged and used in such a manner that a clearance is made between the front face erasable microcapsule magnetophoretic display sheet and the magnet, whereby a magnetic field different from the case where the magnet is brought into direct contact with the sheet acts on microcapsules in the sheet.

According to the present invention, there is further provided a writing magnet for front face erasable microcapsule magnetophoretic display sheets, wherein a magnet is covered with a metal to control a magnetic field.

In the front face erasable microcapsule magnetophoretic display sheet according to the present invention, comprising the support and the solid dispersion layer provided on one surface of the support and composed of the microcapsules having an average particle diameter of 50 to 650 μm, in which the liquid dispersion, the white pigment, the additives and the magnetic particles are encapsulated, and the binder, the magnetic particles may include at least two kinds of magnetic particles different in particle diameter from each other, whereby the magnetic sheet can exhibit a particularly marked effect that characters, diagrams and/or the like magnetically recorded on the magnetic recording sheet can be wholly or partially erased simply and easily from the recording surface side thereof.

In the magnetophoretic display sheet according to the present invention, at least one kind of magnetic particles having a particle diameter ranging from 0.1 μm to 1.0 μm and at least one kind of magnetic particles having a particle diameter greater than the above particles ranging from greater than 1.0 μm to 20 μm may be used as the magnetic particles, whereby the magnetic sheet can exhibit a particularly preferred effect for wholly or partially erasing the magnetically recorded characters, diagrams and/or the like simply and easily from the recording surface side.

In the magnetophoretic display sheet according to the present invention, the proportion of the magnetic particles may be the sum total of 100% by weight of said at least one kind of magnetic particles having a particle diameter ranging from 0.1 μm to 1.0 μm and 10 to 200% by weight of said at least one kind of magnetic particles having a particle diameter greater than the above particles ranging from greater than 1.0 μm to 20 μm, whereby the magnetic sheet can exhibit an excellent effect that the magnetically recorded characters, diagrams and/or the like can be wholly or partially erased simply and easily from the recording surface side.

In the magnetophoretic display sheet according to the present invention, the support may be a releasing member, and the display sheet may be composed of only a support-free solid dispersion layer from which the releasing member has been released and removed, whereby the uses of the sheet can be variously widened without using any writing magnet pen in that it can be used for production of machine readable magnetic records and as inspection materials of steel products or the like.

In the magnetophoretic display sheet according to the present invention, a solvent in the liquid dispersion may be composed of at least one low-boiling solvent selected from the group consisting of toluene, xylene, ethylbenzene, methylcyclohexane, ethylcyclohexane and cyclohexane and at least one high-boiling solvent selected from the group consisting of dodecylbenzene, dipentylbenzene, diphenyl ether, dibenzyl benzoate, phenylxylylethane, diethylbenzene, pentylbenzene, ethyl phthalate and butyl phthalate, and a proportion of the high-boiling solvent to the low-boiling solvent may be 10 to 250 parts by weight per 100 parts by weight of the low-boiling solvent, whereby the dispersoids can be more stably dispersed.

In the erasing magnet for front face erasing according to the present invention, which is adapted to slide it over at least a part of the front face of a front face erasable microcapsule magnetophoretic display sheet, the magnet may be arranged and used in such a manner that a clearance is made between the front face erasable microcapsule magnetophoretic display sheet and the magnet, whereby a magnetic field different from the case where the magnet is brought into direct contact with the sheet acts on microcapsules in the sheet. As a result, an erasing magnet for front face erasing, which has a simple structure and can partially erase characters, diagrams and/or the like from the recording surface side of a recorded sheet can be provided.

In the writing magnet according to the present invention for front face erasable microcapsule magnetophoretic display sheets (hereinafter referred to as "writing magnet for front face erasable sheet"), the magnet may be covered with a metal to control a magnetic field, whereby the writing magnet can exhibit an excellent effect that fine characters, diagrams and/or the like can be clearly displayed.

BRIEF DESCRIPTION OF THE DRAWINGS

The above and other objects, features and advantages of the present invention will become apparent from the following description and the appended claims, taken in conjunction with the accompanying drawings, in which:

FIGS. 1A and 1B are a plan view and a cross-sectional view, respectively, illustrating an erasing magnet for front face erasing according to an embodiment of the present invention;

FIGS. 2A and 2B are a plan view and a cross-sectional view, respectively, illustrating an erasing magnet for front face erasing according to another embodiment of the present invention.

DETAILED DESCRIPTION OF THE PREFERRED EMBODIMENTS

Figure 1A:
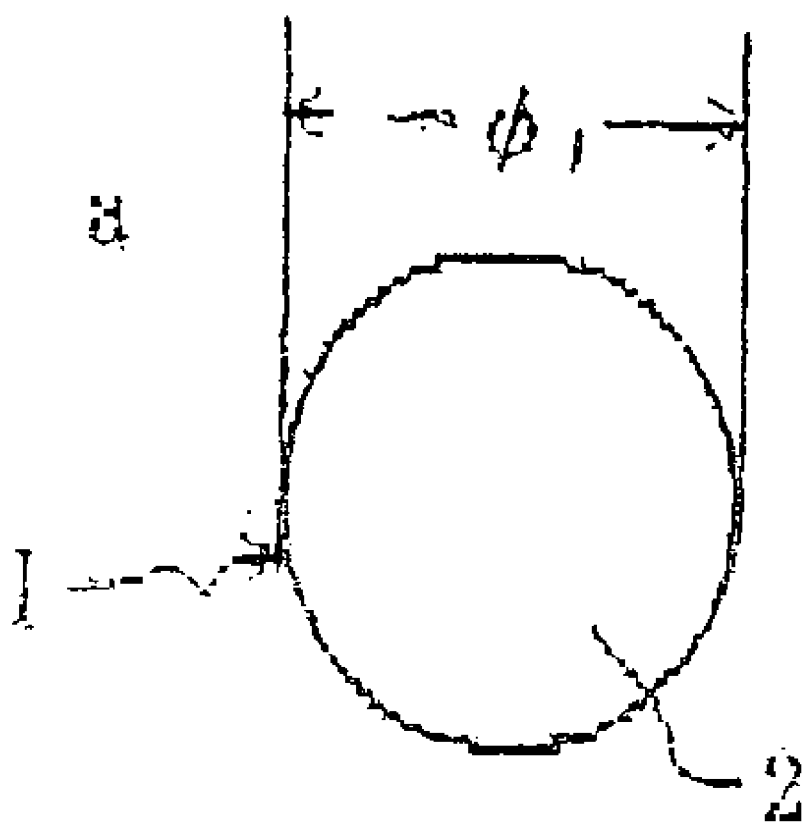

The present invention will hereinafter be described in detail.

In the front face erasable microcapsule magnetophoretic display sheets according to the present invention, at least two kinds of magnetic particles different from each other in particle diameter and material are contained. Any magnetic particles may be used so far as they are ordinarily used in this technical field. Examples thereof include fine particles of black iron oxide, porous iron oxide, manganese dioxide-containing iron oxide, chromium dioxide, ferrite, iron and nickel, and magnetic particles to which no hydrophilic treatment is subjected, such as iron-nickel alloys, with synthetic magnetic iron oxide being particularly preferred. These magnetic materials may be used either singly or in any combination thereof. Examples of commercially available products include Todacolor KN-320 (magnetite, product of Toda Kogyo Corporation and Tarox BL-50 (synthetic iron oxide, product Titan Kogyo K.K. Magnetic iron oxide represented by $Fe_3O_4$ is preferred.

The particle diameter of these magnetic particles are preferably not greater than 20 μm, more preferably 0.1 μm to 20 μm. In the magnetic particle groups different from each other in particle diameter, a group of magnetic particles having a smaller particle diameter has a particle diameter ranging from 0.1 μm to 1.0 μm, and one or more kinds of such magnetic particles are used. On the other hand, a group of magnetic particles having a greater particle diameter has a particle diameter ranging from greater than 1.0 μm to 20 μm, and one or more kinds of such magnetic particles are used. These groups of magnetic particles are not separately used, but used in combination, whereby the greater magnetic particles act so as to aid and facilitate the action of the smaller magnetic particles upon erasing of the resulting magnetophoretic display sheet in such a manner that the greater magnetic particles are temporally attracted by the smaller magnetic particles upon migration and dispersion thereof to migrate in a state attached to the smaller magnetic particles, and the smaller magnetic particles migrate in a state included in the greater magnetic particles. As a result, clean erasing is feasible without leaving the blackness of the smaller magnetic particles. According to the present invention, therefore, the present invention can exhibit a particularly marked effect that characters, diagrams and/or the like magnetically recorded on such a magnetic recording sheet can be partially erased simply and easily from the recording surface side. As described above, in the present invention, such actions and effects as described above are brought about by using, in combination, the magnetic particles having a particle diameter ranging from 0.1 µm to 1.0 µm as a group of the smaller magnetic particles and the magnetic particles having a particle diameter ranging from greater than 1.0 µm to 20 µm as a group of the greater magnetic particles. The effects of the present invention cannot be achieved if this range is departed.

With respect to the microcapsules used in the present invention, in which a liquid dispersion, a white pigment, additives and the magnetic particles are encapsulated, the average particle diameter is 50 to 650 µm, preferably 50 to 400 µm. If the average diameter is smaller than 50 µm, the effects of the present invention cannot be achieved. If the average particle diameter exceeds 650 µm on the other hand, economical disadvantage is incurred. The microcapsules themselves can be easily produced by means of any publicly known production technique. The liquid dispersion used in the present invention is composed of solvents stable to the production of the microcapsules and compatible with each other. The liquid dispersion, a low-boiling solvent and a high-boiling solvent may preferably be used in combination for the purpose of facilitating the movement (migration) of a magnetic material (for example, magnetic particles) and improving contrast. As described above, examples of the low-boiling solvents used in the present invention include toluene, xylene, ethylbenzene, methylcyclohexane, ethylcyclohexane and cyclohexane. These low-boiling solvents may be used either singly or in any combination thereof. Examples of the high-boiling solvents used in the present invention include dodecylbenzene, dipentylbenzene, diphenyl ether, dibenzyl benzoate, diethyl phthalate, phenylxylylethane, diethylbenzene, pentylbenzene, ethyl phthalate and butyl phthalate. These high-boiling solvents may be used either singly or in any combination thereof. A proportion of the high-boiling solvent to the low-boiling solvent is 10 to 250 parts by weight per 100 parts by weight of the low-boiling solvent, preferably 20 to 200 parts by weight per 100 parts by weight of the low-boiling solvent, more preferably 20 to 150 parts by weight per 100 parts by weight of the low-boiling solvent, still more preferably 40 to 100 parts by weight per 100 parts by weight of the low-boiling solvent. If the proportion of the high-boiling solvent to the low-boiling solvent is lower than 10% by weight, the divergence of the low-boiling solvent cannot be prevented. Although mixing in a ball mill or the like is necessary for dispersing the magnetic material and the white pigment in a solvent, only the low-boiling solvent high in volatility cannot be used in the mixing, and so it is necessary to mix at least 10% by weight of the high-boiling solvent. If the proportion of the high-boiling solvent exceeds 250% by weight on the other hand, the movement of the magnetic particles becomes poor.

The white pigment used in the present invention is composed of nonmagnetic particles. Examples thereof include white pigments such as titanium oxide, lithopone, zinc white, white lead and zinc sulfide. The titanium oxide used may be either anatase type and rutile type. Rutile type titanium oxide is preferred from the viewpoint of covering property. These pigments are preferably small in specific gravity. Further, those having relatively high oil absorption (meaning that a solvent is absorbed in the interior of particles) are preferred. No particular limitation is imposed on the particle diameter of the nonmagnetic particles so far as they can be sufficiently dispersed. However, it is generally 0.1 to 20 µm, preferably 0.1 to 10 µm, more preferably 0.1 to 5 µm, still more preferably 0.1 to 1 µm. When the particle diameter of the magnetic particles is great, and the particle diameter of titanium oxide is small, the blackness is not developed though the movement of the magnetic particles becomes fast, so that contrast is deteriorated. When the particle diameter of the magnetic particles is small, and the particle diameter of titanium oxide is great, the movement of the magnetic particles becomes extremely poor though the blackness is developed, and contrast is improved. Thus, such a combination is not preferred. From these facts, it has been found that the size of the nonmagnetic particles is preferably smaller than the magnetic particles.

A proportion of the nonmagnetic particles used in the present invention is 5.0 to 50.0% by weight, preferably 10.0 to 40.0% by weight, more preferably 15.0 to 35.0% by weight based on the weight of the liquid dispersion. If the proportion of the nonmagnetic particles to the liquid dispersion is lower than 5.0% by weight, the resulting sheet becomes blackish as a whole in the case of a thin type in particular, and so contrast is not fully developed, and moreover clear characters and/or images cannot be displayed. If the proportion of the nonmagnetic particles exceeds 50.0% by weight on the other hand, the resulting sheet becomes whitish as a whole on the contrary, and so contrast is not fully developed. In view of these respects, the proportion of the nonmagnetic particles to the magnetic particles is preferably 4 to 30 times, more preferably 5 to 20 times, still more preferably 6.0 to 15.0 times. The resulting sheet can thereby display clear images excellent in contrast even in the case of a thin type.

Examples of the additives used in the present invention include fine particle thickeners and dispersing agents. Examples of the fine particle thickeners include silicic anhydride, hydrous silicic acid, silicates (sodium silicate, potassium silicate, aluminum silicate, calcium silicate, etc.), finely particulate alumina, silica powder, diatomaceous earth, kaolin, hard clay, soft clay, bentonite, ultrafine calcium carbonate, ultrafine activated calcium carbonate, calcium hydrogencarbonate, hydrous basic magnesium carbonate, barium sulfate and benzidine Yellow. These thickeners may be used either singly or in any combination thereof. The amount of the fine particle thickener added to the liquid dispersion varies according to the kind of the liquid dispersion. However, is generally 0.2 to 5% by weight, preferably 0.4 to 2% by weight based on the weight of the liquid dispersion. If the amount of the fine particle thickener added to the liquid dispersion is less than 0.2% by weight, the adjusting effect of such a thickener on the magnetic particles and the nonmagnetic particles cannot be exhibited. On the other hand, any amount exceeding 5% by weight interferes with the movement of solid particles such as the magnetic particles. It is hence not preferable to add the thickener in such a little or great amount.

The dispersing agent used in the present invention is used in dispersing the magnetic particles and the like. Examples of preferable dispersing agents include polyoxyethylene lauryl ether, polyoxyethylene cetyl ether, polyoxyethylene stearyl ether, polyoxyethylene oleyl ether, anionic fatty acid ester mixtures, polycarboxylic acid amine salts, sorbitan trioleate, sorbitan monolaurate and sorbitan monostearate. The amount of the dispersing agent added may be an amount ordinarily added as a dispersing agent. However, it is generally 0.2 to 10% by weight, preferably 0.4 to 3.0% by weight based on the liquid dispersion. If the amount of the dispersing agent added is less than 0.2% by weight, sufficient dispersing effect cannot be achieved. If the amount exceeds 10% by weight on the other hand, the viscosity of the liquid dispersion becomes high, and so the properties of the liquid dispersion are impaired.

In addition, colorants may be added to the liquid dispersion as needed. As the colorants, dyes and pigments are generally used. Examples of the dyes and pigments include dyes such as Methylene Blue, Congo Red and Benzo Yellow TZ, and besides Oil Blue, Oil Green, Oil Yellow and Benzidine Yellow. The colorant may be contained in any gelatin film of a microcapsule, a transparent aqueous additive in a microcapsule coating layer and a transparent film, to say nothing of the liquid dispersion in the microcapsules, whereby the microcapsules can be colored the proper color. A back surface or background of a magnetic display panel can be thereby colored various colors.

In the front face erasable microcapsule magnetophoretic display sheets described above, the proportion of the magnetic particles is the sum total of 100% by weight of at least one kind of the magnetic particles (hereinafter referred to as "small particles") having a particle diameter ranging from 0.1 µm to 1.0 µm and 10 to 200% by weight of at least one kind of the magnetic particles (hereinafter referred to as "large particles") having a particle diameter greater than the above particles ranging from greater than 1.0 µm to 20 µm. A proportion of the large particles to the small particles is preferably 50 to 150% by weight, more preferably 80 to 120% by weight per 100% by weight of the small particles. If the proportion of the large particles is lower than 10% by weight, the movement of the small particles cannot be sufficiently aided. If the proportion of the large particles exceeds 200% by weight on the other hand, blackness cannot be sufficiently developed, so that clear characters and/or diagrams cannot be displayed. Accordingly, the present invention can exhibit an excellent effect that characters, diagrams and/or the like magnetically recorded can be simply and easily erased partially from the recording surface side by adjusting the proportions of the small particles and the large particles to 10 to 200% by weight per 100% by weight of the small particles, particularly 50 to 150% by weight per 100% by weight of the small particles.

In the front face erasable microcapsule magnetophoretic display sheets according to the present invention, the support is a releasing member, and the display sheet is composed of only a support-free solid dispersion layer from which the releasing member has been released and removed, whereby the uses of the sheets can be variously widened without using any writing magnet pen in that they can be used for production of machine readable magnetic records and as inspection materials of steel products or the like.

In the erasing magnet for front face erasing according to the present invention, which is adapted to slide it over at least a part of the front face of the front face erasable microcapsule magnetophoretic display sheet, the magnet is arranged and used in such a manner that a clearance is made between the front face erasable microcapsule magnetophoretic display sheet and the magnet. The principle of the erasing magnet for front face erasing according to the present invention will hereinafter be described. The erasing magnet for front face erasing means a magnet capable of erasing characters, diagrams and/or the like magnetically recorded on the front face of the front face erasable microcapsule magnetophoretic display sheet by sliding the erasing magnet over the front face of the display sheet from the displayed surface side. This magnet emits countless magnetic lines from its N pole toward its S pole to form a magnetic field. In these magnetic lines, there are portions almost horizontally acting on the magnet at a position somewhat distant from the magnet. A region of the almost horizontally acting magnetic lines is caused to act on the microcapsules in the microcapsule magnetophoretic display sheet, whereby the magnetic particles in the microcapsules are moved and dispersed by the action of the magnetic lines. As a result, the nonmagnetic particles composed of the white pigment particles are substitutively gathered in plenty at the surface on the front face side to exhibit a white color. The present inventors have paid attention to the fact that this almost horizontally acting magnetic field is generated only by selecting an erasing magnet having the desired nature, and this nature is very weak.

According to the erasing magnet of the present invention, by taking the construction as described above, an erasing magnet which has a simple structure and can wholly or particularly partially erase characters, diagrams and/or the like from the recording surface side of a recorded sheet with ease by causing a magnetic field different from the case where a magnet is brought into direct contact with the sheet, i.e., with the generation of a magnetic field is controlled, to act on the microcapsules in the sheet can be provided. As a material for the magnet, ferrite, rare earth metals, Alnico alloy or the like may be used. However, the material for the magnet is not limited to these materials.

The erasing magnet for front face erasing according to the present invention will be described in more detail. An erasing magnet having a property value of 100 to 750 G in terms of surface magnetic flux density is preferably used. A magnet used herein varies according to the uses of the display sheet, and so it is widely selected according to the uses thereof without any particular limitations. Its form may be any form of cylinder, coin, rod, prism and the like, and its size may be suitably selected. For erasing magnets used in front face erasing, ferrite magnets, rare earth magnets such as rare earth cobalt magnets (for example, samarium.cobalt magnet) and rare earth iron magnets (neodymium.iron magnet, etc.), and bond magnets are preferred. Double-side magnetization IP (the surface magnetic flux density amounts to 100 to 750 G under these conditions) is the type of magnetization of the magnet in this embodiment. As a particularly preferable magnet, an isotropic or anisotropic rare earth magnet or ferrite magnet may be used. Clear erasing is feasible by selecting a magnet and the kind of magnetization listed above. In the erasing magnet for front face erasing used in the present invention, it is preferred to control the generation of a magnetic field by providing a clearance. A clearance distance is often determined by the material of the magnet used. No particular limitation is imposed on a method for providing the clearance. For example, either an air layer or a nonmagnetic material may be provided between the front face erasable microcapsule magnetophoretic display sheet and the magnet of the erasing magnet. In the present invention, a method of uniting the magnet to the nonmagnetic material is preferred.

No particular limitation is imposed on the nonmagnetic material. However, preferable examples thereof include resins, sponge or sponge resins, rubber, wood, corrugated board, paper, fibers, glass and metals. These materials may be preferably capable of smoothly sliding on the magnetic display sheet. As a method for uniting the magnet to the nonmagnetic material, either bonding or fitting, or integral molding between different materials in the case of resins or rubber may be used. The clearance may also be provided either on the erasing surface side alone or on both sides thereof. When the clearance is provided on both sides, there is no need to distinguish the erasing side of the magnet. When the clearance is provided on all the surfaces of the magnet, recesses conformed to fingers or a lug or handle may preferably be provided to make handling easy.

FIGS. 1A and 1B are a plan view and a cross-sectional view, respectively, illustrating an erasing magnet for front face erasing and a front face erasable microcapsule magnetophoretic display sheet according to an embodiment of the present invention, in which FIG. 1A is a plan view showing the erasing magnet for front face erasing, and FIG. 1B is a cross-sectional view showing the erasing magnet for front face erasing and the front face erasable microcapsule magnetophoretic display sheet. FIGS. 2A and 2B are a plan view and a cross-sectional view, respectively, illustrating the front face erasable microcapsule magnetophoretic display sheet and an erasing magnet for front face erasing according to another embodiment of the present invention, in which FIG. 2A is a plan view showing the erasing magnet for front face erasing according to another embodiment, and FIG. 2B is a cross-sectional view showing the front face erasable microcapsule magnetophoretic display sheet and the erasing magnet for front face erasing. FIG. 1A illustrates the erasing magnet I for front face erasing having a circular section and a diameter, $\phi_1$ of 10 to 100 mm. As illustrated in FIG. 1B, the erasing magnet I for front face erasing has a clearance 3 on a lower surface of a magnet 2 for erasing and comes into contact with a front face 1a of the front face erasable microcapsule magnetophoretic display sheet 1 through the clearance 3. In this embodiment, the thickness, z of the magnet 2 for erasing is 2 to 20 mm, and the thickness, z' of the clearance is expressed by 0.2Z to 20Z. Similarly, FIG. 2A illustrates the erasing magnet II for front face erasing having a rectangular section and a size of 10 to 100 mm in breadth, x and 10 to 100 mm in length, y. As illustrated in FIG. 2B, the erasing magnet II for front face erasing has a clearance 3 on a lower surface of a magnet 2 for erasing. In this embodiment, the values of z and z' are the same as in FIG. 1B.

As illustrated in FIGS. 1A to 2B, the diameter, $\phi_1$ is 10 to 100 mm, x is 10 to 100 mm, and y is 10 to 100 mm, and no particular limitation is imposed on the shape and size of the erasing magnets I and II for front face erasing so far as the dimensions fall within the respective ranges described above. The values of $\phi_1$, x and y are can be determined can be determined according to the sizes of the front face erasable microcapsule magnetophoretic display sheet 1 used and characters to be written thereon. Z is 2 to 20 mm, and z' is 0.2Z to 20Z, preferably 0.2z to 5.0z, more preferably 0.5z to 2.0z, most preferably 0.5z to 1.0z. If z is out of the range of 2 to 20 mm, handling is difficult in view of the size, weight, etc. If z' is smaller than 0.2z, a magnetic field applied to the front face erasable microcapsule magnetophoretic display sheet 1 comes near to perpendicular, and so the surface of the sheet becomes blackish. If z' exceeds 20z on the other hand, no magnetic field can be applied to the front face erasable microcapsule magnetophoretic display sheet 1, and so written characters cannot be erased. Such a small or great clearance is hence not preferred. In these limitations, z' is particularly important from the viewpoint of causing the magnetic field to suitably act on the magnetic display sheet.

Figure 3A:
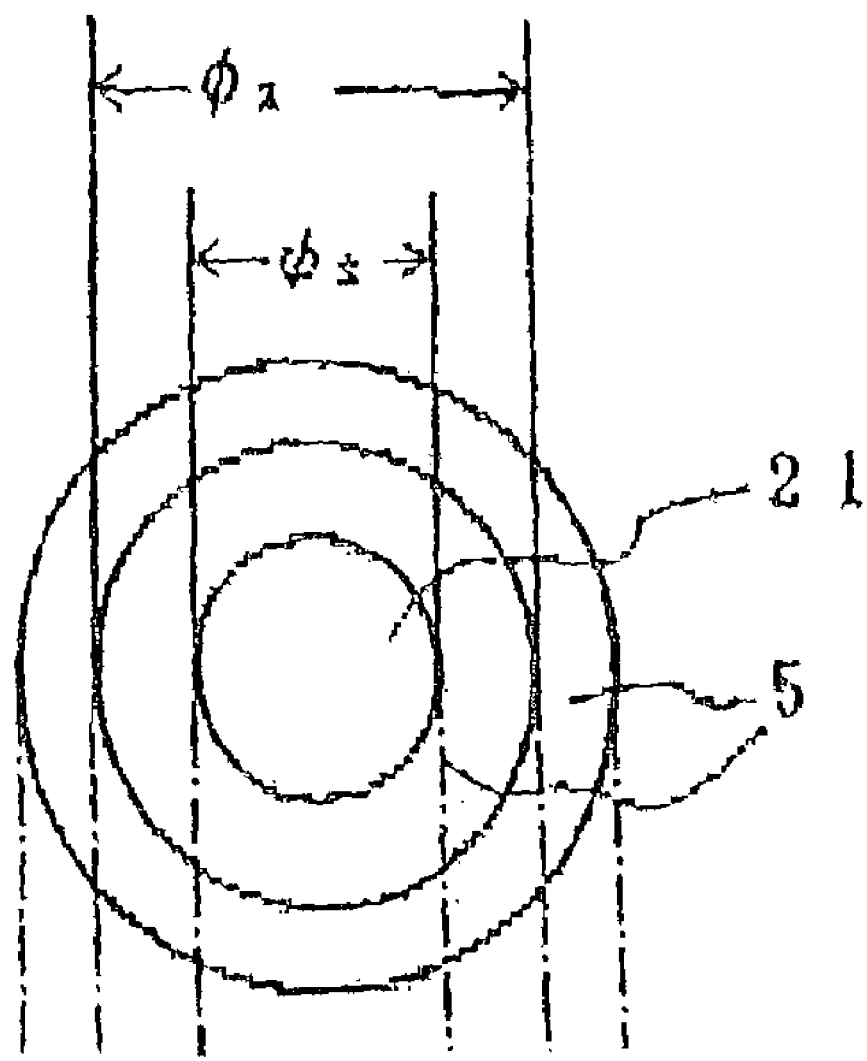
FIGS. 3A and 3B are a plan view and a cross-sectional view, respectively, illustrating a writing magnet for front face erasable sheet used in the present invention.
Figure 3B:
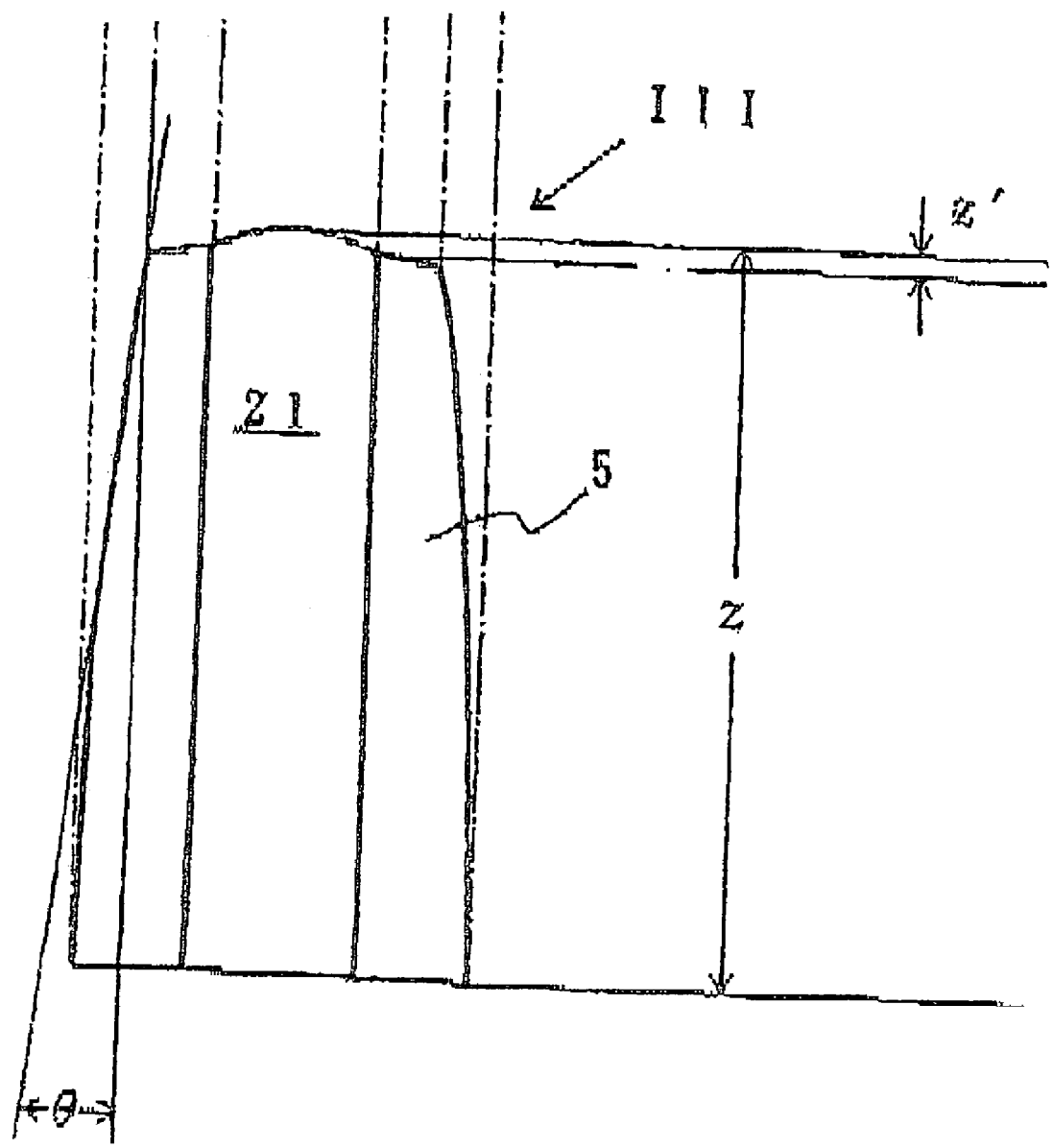

FIGS. 3A and 3B illustrate a writing magnet III for front face erasable sheet according to the present invention. As illustrated in FIG. 3A, a writing magnet 21 is covered with a metal 5 to control a magnetic field. More specifically, it is a publicly known technique to cover a magnet with a metal such as brass or iron to partially control the generation of a magnetic field, whereby fine and clear written characters can be formed on a magnetic display sheet like the conventional writing magnet. In the writing magnet III for front face erasable sheet used for the front face writable and erasable magnetic display sheet (i.e. the front face erasable microcapsule magnetophoretic display sheet) according to the present invention, however, the generation of a magnetic field must be more severely controlled than the front face writable and rear face erasable magnetic display sheet. In the writing magnet III used in the present invention, ferrite, rare earth metals, Alnico alloy or the like may be used as a material of a magnet 21 for writing. However, the material for the magnet 21 is not limited to these materials. More specifically, the kind of magnetization of the magnet 21 used for writing, is double-side magnetization IP (the surface magnetic flux density amounts to at least 750 G under these conditions). In order to produce the writing magnet III for front face erasable sheet using such a magnet 21 for writing, the tip of the magnet 21 for writing is coated with a metal 5 composed of a ferromagnetic material. A magnetic force distribution can be thereby more concentrated, and so a clear record can be effectively provided. As the coating metal 5, is generally preferably used brass or iron excellent in working ability and stability. However, the material is not limited to these metals so far as it can easily control a magnetic field.

The writing magnet for front face erasable sheet according to the present invention will be described in more detail. FIGS. 3A and 3B are a plan view and a cross-sectional view, respectively, illustrating the writing magnet for front face erasable sheet used in the present invention. As illustrated in FIGS. 3A and 3B, the writing magnet III for front face erasable sheet is composed of a rod magnet 21 having a diameter of $\phi_2$, and coated with the metal 5 under such conditions that an angle formed between a diameter, $\phi_2'$ of a coating on the tip portion and a diameter of a coating on the rear end is θ.

With respect to the shape and size of the magnet for writing used in producing the writing magnet III for front face erasable sheet, $\phi_2$ is 0.2 to 2.0 mm, preferably 0.8 to 1.2 mm. $\phi_2'$ is $1.0\phi_2$ to $4.0\phi_2$ mm, preferably $2.0\phi_2$ to $3.0\phi_2$. If $\phi_2$ is smaller than 0.2 mm, and $\phi_2'$ is smaller than $1.0\phi_2$, working is difficult, strength becomes insufficient, and no preference is given even from the viewpoint of safety. If $\phi_2$ exceeds 2.0 mm on the other hand, a magnetic field generated by such a magnet becomes too great, and so characters written by the resulting writing magnet becomes thick. In FIG. 3B, z is 5.0 to 10.0 mm, and z' is −0.3 to 1.0 mm, preferably 0.0 to 0.5 mm. If $\phi_2'$ is out of the range of $1.0\phi_2$ to $4.0\phi_2$ mm, and z' is out of the range of −0.3 to 1.0 mm, it is impossible to control the magnetic field to a desired value, and so written characters become unclear. Any z' greater than 1.0 mm is not preferred even from the viewpoint of safety. No particular limitation is imposed on z, and z is preferably matched to a pen body. No particular limitation is also imposed on θ. In these requirements, z' is particularly important from the viewpoint of controlling the magnetic field. By satisfying these conditions, the writing magnet III for front face erasable sheet can exhibit an excellent effect that fine characters, diagrams and/or the like can be clearly displayed. Incidentally, the metal coating 5 is provided for the purpose of concentrating a magnetic force distribution, and so the coating form of the metal 5 can be optionally determined by tests and the like.

The front face erasable microcapsule magnetophoretic display sheets according to the present invention can be used in various application fields, for example, cards such as cash cards, cashless cards, credit cards and prepaid cards, and besides general uses, for example, illustrated books for little children, toys for little children, character drills, panels for various games, boards for penmanship, sheets and boards having an adhesive layer on their rear faces, boards for writing memos, black boars for meeting, various information boards in clean rooms, sign boards with lamp, display panels for personal computers, etc. As special uses, they can be used for production of machine readable magnetic records and as inspection materials of steel products or the like.

The present invention will hereinafter be described in more detail by the following examples. However, the following examples are intended to explain the present invention, and so the present invention is not limited to these examples.

EXAMPLE 1

(I) Preparation Process of Microcapsules:

[Formulation of Liquid Dispersion A to be Encapsulated in Microcapsule]

| | |
|---|---|
| Smaller magnetic particle (synthetic iron oxide, 0.3 μm) | 1.5 wt. % |
| Greater magnetic particle (synthetic iron oxide, 3 μm) | 1.5 wt. % |
| Nonmagnetic particle (white titanium oxide powder, R-820, 0.26 μm, product of Ishihara Sangyo Kaisha, Ltd.) | 12.0 wt. % |
| High-boiling solvent (dibutyl phthalate) | 40.0 wt. % |
| Low-boiling solvent (toluene) | 43.6 wt. % |
| Antifoaming agent (Dappo SN-350, silicone, product of San Nopco Limited) | 0.2 wt. % |
| Suspending agent (finely particulate silicic acid, Aerosil, product of Nippon Aerosil Co., Ltd.) | 0.5 wt. % |
| Dispersing agent (Nopcosanto K963 product of San Nopco Limited) | 0.7 wt. % |

A 3.6% aqueous solution of gum arabic was added to a 3.6% aqueous solution of gelatin adjusted to pH 6 to prepare an aqueous solution for microcapsule film. After the solution was heated to about 50° C., and the pH of the solution was adjusted to 5, Liquid Dispersion A formulated above was added, and the resultant mixture was stirred in such a manner that the average droplet diameter of droplets of the dispersion amounts to 100 μm. After the desired dispersion droplets were obtained, the dispersion was slowly cooled to 10° C. to gel a polymer film of gelatin/gum arabic deposited interfaces between the dispersion droplets. A 25% aqueous solution of glutaraldehyde was added to cure the polymer film to obtain gelatin microcapsules. The microcapsule thus obtained were classified through a screen to remove particles of a size exceeding 250 μm, thereby obtaining microcapsules having a particle diameter of 250 μm or smaller.

(2) Production of Front Face Erasable Microcapsule Magnetophoretic Display Sheet:

An aqueous solution of a urethane resin as a aqueous binder was added to a group of microcapsules obtained by removing water from the microcapsules obtained above, and the resultant mixture was fully stirred to form an inky product for coating. The viscosity of this inky product for coating was 4,000 cPs. The thus-obtained inky product for coating was applied to the surface of a transparent film having a thickness of 75 μm and dried with hot air of 70° C. for 40 minutes. The thickness of the microcapsule-containing coating layer was 250 μm. As a protective member, a polyethylene terephthalate film having a thickness of 50 μm was further bonded to the microcapsule-containing coating layer with an adhesive to produce a microcapsule magnetic display sheet.

(3) Production of Erasing Magnet for Front Face Erasing:

An erasing magnet was formed in the shape of a coin as illustrated in FIG. 1A using ferrite as a material of the magnet. The diameter $\phi_1$ and thickness z thereof were determined to be 30 mm and 3.0 mm, respectively. On the other hand, an ABS resin (acrylonitrile.butadiene.styrene resin) was used as a material of a clearance to form a clearance having a diameter $\phi_1$ of 30 mm and a thickness z' of 2.0 mm in the shape of a coin. The coin-shaped ferrite and the coin-shaped ABS resin were then integrally bonded to each other to provide an erasing magnet I for front face erasing.

(4) Production of Writing Magnet for Front Face Erasable Sheet:

A circular rod-shaped ferrite magnet 21 was coated with brass 5 as illustrated in FIGS. 3A and 3B, thereby producing a writing magnet III for front face erasable sheet. A diameter of the magnet $\phi_2$ and a diameter $\phi_2'$ of a coating on the tip portion were 1.0 mm and 2.5 mm, respectively, and z and z' were 7.0 mm and 0.0 mm, respectively. A handle was attached thereto to provide a writing magnet pen for front face erasable sheet.

(5) Evaluation of Front Face Erasable Microcapsule Magnetophoretic Display Sheet:

The erasing magnet I for front face erasing was slid across the whole display surface of the front face erasable microcapsule magnetophoretic display sheet 1 to erase the whole display surface into a uniform clear white surface. Characters were written on this surface with the writing magnet pen for front face erasable sheet. As a result, both greater magnetic particles and smaller magnetic particles migrated on the front face side to obtain a black clear written display. In order to erase a part of the recorded characters, the erasing magnet I for front face erasing was brought into contact with the written display and scanned on a portion to be erased. As a result, the characters of the scanned region were able to be cleanly erased to make the scanned region a uniform clear white surface.

EXAMPLE 2

(1) Preparation Process of Microcapsules:

[Formulation of Liquid Dispersion B to be Encapsulated in Microcapsule]

| | |
|---|---|
| Smaller magnetic particle (synthetic iron oxide, 0.3 μm) | 1.5 wt. % |
| Greater magnetic particle (synthetic iron oxide, 3 μm) | 1.0 wt. % |
| Greater magnetic particle (synthetic iron oxide, 10 μm) | 0.5 wt. % |
| Nonmagnetic particle (white titanium oxide powder, R-820, 0.26 μm, product of Ishihara Sangyo Kaisha, Ltd.) | 12.0 wt. % |
| High-boiling solvent (dibutyl phthalate) | 40.0 wt. % |
| Low-boiling solvent (toluene) | 43.6 wt. % |
| Antifoaming agent (Dappo SN-350, silicone, product of San Nopco Limited) | 0.2 wt. % |
| Suspending agent (finely particulate silicic acid, Aerosil, product of Nippon Aerosil Co., Ltd.) | 0.5 wt. % |
| Dispersing agent (Nopcosanto K963 product of San Nopco Limited) | 0.7 wt. % |

(2) Production of Front Face Erasable Microcapsule Magnetophoretic Display Sheet:

Microcapsules were prepared in the same manner as in Example 1 except that Liquid Dispersion B was used, and a front face erasable microcapsule magnetophoretic display sheet was produced in the same manner as in Example 1 except that the microcapsules obtained above were used.

(3) Evaluation of Front Face Erasable Microcapsule Magnerophoretic Display Sheet.

Such an erasing magnet II for front face erasing as illustrated in FIG. 2A was slid across the whole display surface of the front face erasable microcapsule magnetophoretic display sheet 1 to erase the whole display surface into a uniform clear white surface. Characters were written on this surface with the writing magnet pen for front face erasable sheet. As a result, a black clear written display was obtained. In order to erase the whole of the recorded characters, the erasing magnet II for front face erasing was brought into contact with the display surface and scanned over the whole surface. As a result, the whole display surface was able to be made a uniform clear white surface. The conventional erasing magnet was also slid on the whole display surface of the front face erasable microcapsule magnetophoretic display sheet 1. As a result, the surface did not become white and entirely remained blackish (blackish gray).

COMPARATIVE EXAMPLE 1

(1) Preparation Process of Conventional Microcapsules:

[Formulation of Liquid Dispersion C to be Encapsulated in Microcapsule]

| | |
|---|---|
| Smaller magnetic particle (synthetic iron oxide, 0.3 μm) | 3.0 wt. % |
| Nonmagnetic particle (white titanium oxide powder, R-820, 0.26 μm, product of Ishihara Sangyo Kaisha, Ltd.) | 12.0 wt. % |
| High-boiling solvent (dibutyl phthalate) | 40.0 wt. % |
| Low-boiling solvent (toluene) | 43.6 wt. % |
| Antifoaming agent (Dappo SN-350, silicone, product of San Nopco Limited) | 0.2 wt. % |
| Suspending agent (finely particulate silicic acid, Aerosil, product of Nippon Aerosil Co., Ltd.) | 0.5 wt. % |
| Dispersing agent (Nopcosanto K963 product of San Nopco Limited) | 0.7 wt. % |

(2) Production of Conventional Microcapsule Magnetophoretic Display Sheet:

Microcapsules were prepared in the same manner as in Example 1 except that Liquid Dispersion C was used, and a conventional microcapsule magnetophoretic display sheet was produced in the same manner as in Example 1 except that the microcapsules obtained above were used.

(3) Evaluation of Conventional Microcapsule Magnetophoretic Display Sheet:

An erasing magnet II for front face erasing (see FIGS. 2A and 2B) was slid across the whole rear face of the conventional microcapsule magnetophoretic display sheet. As a result, the front face exhibited a white color. When characters were then written on this surface with the writing magnet pen for front face erasable sheet, a black clear written display was obtained like Example 1. When the erasing magnet II for front face erasing was brought into contact with the whole display surface and scanned over the whole surface, however, the display surface was extremely blackish (blackish gray). When characters were then written on this surface with the writing magnet pen for front face erasable sheet, written characters were very poor in contrast, and so the resultant written display was entirely poor in utility. Characters were further written with a conventional writing magnet pen after the erasing magnet II for front face erasing was slid across the whole rear face of the conventional microcapsule magnetophoretic display sheet to erase the display surface clean. As a result, the resultant written display slightly had an unclear portion, but caused no problems in practical use.

COMPARATIVE EXAMPLE 2

(1) Preparation Process of Conventional Microcapsules:

[Formulation of Liquid Dispersion D to be Encapsulated in Microcapsule]

| | |
|---|---|
| Greater magnetic particle (synthetic iron oxide, 3 μm) | 3.0 wt. % |
| Nonmagnetic particle (white titanium oxide powder, R-820, 0.26 μm, product of Ishihara Sangyo Kaisha, Ltd.) | 12.0 wt. % |
| High-boiling solvent (dibutyl phthalate) | 40.0 wt. % |
| Low-boiling solvent (toluene) | 43.6 wt. % |
| Antifoaming agent (Dappo SN-350, silicone, product of San Nopco Limited) | 0.2 wt. % |
| Suspending agent (finely particulate silicic acid, Aerosil, product of Nippon Aerosil Co., Ltd.) | 0.5 wt. % |
| Dispersing agent (Nopcosanto K963 product of San Nopco Limited) | 0.7 wt. % |

(2) Production of Conventional Microcapsule Magnetophoretic Display Sheet:

Microcapsules were prepared in the same manner as in Example 1 except that Liquid Dispersion D was used, and a conventional microcapsule magnetophoretic display sheet was produced in the same manner as in Example 1 except that the microcapsules obtained above were used.

(3) Evaluation of Conventional Microcapsule Magnetophoretic Display Sheet:

An erasing magnet II for front face erasing was slid across the whole display surface of the conventional microcapsule magnetophoretic display sheet. As a result, the surface exhibited a blackish gray color. When characters were then written on this surface with the writing magnet pen for front face erasable sheet, only a written display very low in contrast was obtained. The same result was obtained even when characters were written with a conventional writing magnet pen. A conventional erasing magnet was slid across the whole display surface of the conventional microcapsule magnetophoretic display sheet to wholly erase the display surface. However, the display surface remained black as a whole. Characters were written on this display surface with the writing magnet pen for front face erasable sheet and the conventional writing magnet pen. In any case, however, no character was unable to be written.

EXAMPLES 3 AND 4

Production of Erasing Magnet (Coin Shape) for Front Face Erasing:

Erasing magnets were respectively produced with materials and in sizes shown in Table 1 in the form of a coin as illustrated in FIG. 1A. They are shown in Table 1 together with Comparative Examples.

When the erasing magnet A for front face erasable sheet according to the present invention was used to erase a written display recorded on a front face erasable microcapsule magnetophoretic display sheet, the written display was able to be very clearly erased, the display surface was visually observed becoming clear white. In addition, no unevenness occurred. When the comparative erasing magnet E was used, a written display was able to be erased, but the surface was somewhat blackish. Therefore, contrast was slightly lowered. However, no problem was offered in practical use though unevenness slightly occurred. On the other hand, the comparative erasing magnet G failed to erase a written display. The comparative erasing magnet C was able to erase a written display, but the display surface became very blackish, and so contrast was very lowered, which caused a problem in practical use. In addition, unevenness was heavy.

EXAMPLES 5 AND 6

Production of Erasing Magnet (Rectangle) for Front Face Erasing:

Erasing magnets were respectively produced with materials and in sizes shown in Table 2 in the form of a rectangle as illustrated in FIG. 2A. They are shown in Table 2 together with Comparative Examples.

TABLE 1

|             |                       | Ex. 3            | Comp. Ex. 3      | Ex. 4            | Comp. Ex. 4      |
|-------------|-----------------------|------------------|------------------|------------------|------------------|
| Coin-shaped | Component of magnet   | Erasing magnet A | Erasing magnet C | Erasing magnet E | Erasing magnet G |
|             | Material of magnet    | Ferrite          | Ferrite          | Ferrite          | Ferrite          |
|             | Diameter $\phi_1$ (mm) | 30              | 30               | 30               | 30               |
|             | Thickness z (mm)      | 3.0              | 3.0              | 3.0              | 3.0              |
|             | Material of clearance | ABS resin        | —                | ABS resin        | ABS resin        |
|             | Diameter $\phi_1$ (mm) | 30              | —                | 30               | 30               |
|             | Thickness z' (mm)     | 3.0              | 0 (direct contact) | 0.6            | 63               |
|             | Uniting method of both | Bonding         | —                | Bonding          | Bonding          |

TABLE 2

|             |                       | Ex. 5            | Comp. Ex. 5      | Ex. 6            | Comp. Ex. 6      |
|-------------|-----------------------|------------------|------------------|------------------|------------------|
| Coin-shaped | Component of magnet   | Erasing magnet B | Erasing magnet D | Erasing magnet F | Erasing magnet H |
|             | Material of magnet    | Rare earth       | Rare earth       | Rare earth       | Rare earth       |
|             | Breadth x (mm)        | 50               | 50               | 50               | 50               |
|             | Length y (mm)         | 30               | 30               | 30               | 30               |
|             | Thickness z (mm)      | 15               | 15               | 15               | 15               |
|             | Material of clearance | Syn. rubber      | —                | Syn. rubber      | Syn. rubber      |
|             | Breadth x (mm)        | 50               | 50               | 50               | 50               |
|             | Length y (mm)         | 30               | 30               | 30               | 30               |
|             | Thickness z' (mm)     | 15               | 0 (direct contact) | 3.0            | 330              |
|             | Uniting method of both | Integral molding | —              | Integral molding | Integral molding |

When the erasing magnet B for front face erasable sheet according to the present invention was used to erase a written display recorded on a front face erasable microcapsule magnetophoretic display sheet, the written display was able to be very clearly erased, the display surface was visually observed becoming clear white. In addition, no unevenness occurred. When the comparative erasing magnet F was used, a written display was able to be erased, but the surface was somewhat blackish. Therefore, contrast was slightly lowered. However, no problem was offered in practical use though unevenness slightly occurred. On the other hand, the comparative erasing magnet H failed to erase a written display. The comparative erasing magnet D was able to erase a written display, but the display surface became very blackish, and so contrast was very lowered, which caused a problem in practical use. In addition, unevenness was heavy.

EXAMPLE 7

Production of Writing Magnet for Front Face Erasable Sheet:

Writing magnets for front face erasable sheet were respectively produced with materials and in sizes shown in Table 3 by coating each writing magnet with a metal as illustrated in FIGS. 3A and 3B. A handle was attached to each writing magnet to provide a writing magnet pen for front face erasable sheet.

TABLE 3

| | Component of magnet | Writing magnet A | Writing magnet B | Writing magnet C | Writing magnet D | Writing magnet E | Writing magnet F | Writing magnet G | Writing magnet H | Writing magnet I |
|---|---|---|---|---|---|---|---|---|---|---|
| Brass | Material of magnet | Ferrite | Rare earth | Ferrite | Rare earth | Ferrite | Rare earth | Ferrite | Rare earth | Rare earth |
| | Diameter $\phi_2$(mm) | 1.0 | 1.2 | 1.0 | 1.2 | 1.0 | 1.2 | 1.0 | 1.2 | 2.5 |
| | Diameter $\phi_2'$(mm) | 2.5 | 2.4 | 2.5 | 2.4 | 2.5 | 2.4 | 2.5 | 2.4 | 4.5 |
| | z(mm) | 7.0 | 6.0 | 7.0 | 6.0 | 7.0 | 6.0 | 7.0 | 6.0 | 6.0 |
| | z'(mm) | 0.0 | 0.2 | No coated | No coated | 2.0 | 1.8 | −0.5 | −0.4 | 0.0 |

The writing magnets A and B for front face erasable sheet were respectively used to conduct recording on a front face erasable microcapsule magnetophoretic display sheet. As a result, both large characters and small characters recorded thereon were very clear. When the writing magnets E, F, G, H and I for front face erasable sheet were respectively used to conduct recording on a front face erasable microcapsule magnetophoretic display sheet, large characters were clear, but small characters were somewhat unclear. However, they caused no problem in practical use. When the writing magnets C and D for front face erasable sheet were respectively used to conduct recording, both large characters and small characters were unclear. In particular, intersecting portions of the characters were indistinct.

According to the present invention, as described above, in the front face erasable microcapsule magnetophoretic display sheet, comprising the support and the solid dispersion layer provided on one surface of the support and composed of the microcapsules having an average particle diameter of 50 to 650 μm, in which the liquid dispersion, the white pigment, the additives and the magnetic particles are encapsulated, and the binder, the magnetic particles include at least two kinds of magnetic particles different in particle diameter from each other, whereby the magnetic sheet can exhibit a particularly marked effect that characters, diagrams and/or the like magnetically recorded on the magnetic recording sheet can be wholly or partially erased simply and easily from the recording surface side thereof.

In the erasing magnet for front face erasing according to the present invention, which is adapted to slide it over at least a part of the front face of a front face erasable microcapsule magnetophoretic display sheet, the magnet is arranged and used in such a manner that a clearance is made between the front face erasable microcapsule magnetophoretic display sheet and the magnet, whereby a magnetic field different from the case where the magnet is brought into direct contact with the sheet acts on microcapsules in the sheet. As a result, an erasing magnet for front face erasing, which has a simple structure and can partially erase characters, diagrams and/or the like from the recording surface side of a recorded sheet can be provided.

In the writing magnet for front face erasable sheet according to the present invention, the magnet is covered with a metal to control a magnetic field, whereby the writing magnet can exhibit an excellent effect that fine characters, diagrams and/or the like can be clearly displayed.

What is claimed is:

1. A front face erasable microcapsule magnetophoretic display sheet comprising a support and a solid dispersion layer provided on one surface of the support and composed of microcapsules having an average particle diameter of 50 to 650 μm, in which a liquid dispersion, a white pigment, additives and magnetic particles are encapsulated, and a binder, wherein the magnetic particles include at least two kinds of magnetic particles different in particle diameter from each other.

2. The front face erasable microcapsule magnetophoretic display sheet according claim 1, wherein at least one kind of magnetic particles having a particle diameter ranging from 0.1 μm to 1.0 μm and at least one kind of magnetic particles having a particle diameter greater than the above particles ranging from greater than 1.0 μm to 20 μm are used as the magnetic particles.

3. The front face erasable microcapsule magnetophoretic display sheet according claim 2, wherein the proportion of the magnetic particles is the sum total of 100% by weight of said at least one kind of magnetic particles having a particle diameter ranging from 0.1 μm to 1.0 μm and 10 to 200% by weight of said at least one kind of magnetic particles having a particle diameter greater than the above particles ranging from greater than 1.0 μm to 20 μm.

4. The front face erasable microcapsule magnetophoretic display sheet according claim 1, wherein the support is a releasing member, and the display sheet is composed of only a support-free solid dispersion layer from which the releasing member has been released and removed.

5. The front face erasable microcapsule magnetophoretic display sheet according claim 1, wherein a solvent in the liquid dispersion is composed of at least one low-boiling solvent selected from the group consisting of toluene, xylene, ethylbenzene, methylcyclohexane, ethylcyclohexane and cyclohexane and at least one high-boiling solvent selected from the group consisting of dodecylbenzene, dipentylbenzene, diphenyl ether, dibenzyl benzoate, phenylxylylethane, diethylbenzene, pentylbenzene, ethyl phthalate and butyl phthalate, and a proportion of the high-boiling solvent to the low-boiling solvent is 10 to 250 parts by weight per 100 parts by weight of the low-boiling solvent.

6. The display sheet of claim 1, wherein the sheet further comprises:
- at least one fine particle thickener selected from silicic anhydride, hydrous silicic acid, silicates, finely particulate alumina, silica powder, diatomaceous earth, kaolin, hard clay, soft clay, bentonite, ultrafine calcium carbonate, ultrafine activated calcium carbonate, calcium hydrogencarbonate, hydrous basic magnesium carbonate, barium sulfate, or benzidine Yellow; and,
- at least one dispersing agent selected from polyoxyethylene lauryl ether, polyoxyethylene cetyl ether, polyoxyethylene stearyl ether, polyoxyethylene oleyl ether, anionic fatty acid ester mixtures, polycarboxylic acid amine salts, sorbitan trioleate, sorbitan monolaurate, or sorbitan monostearate.

7. The display sheet of claim 6, wherein the particle thickener is 0.2 to 5% by weight and the dispersing agent is 0.2 to 10% by weight.

8. The display sheet of claim 7, wherein the particle thickener is 0.4 to 2% by weight and the dispersing agent is 0.4 to 3.0% by weight.

9. The display sheet of claim 2, wherein the proportion of the particles having a diameter ranging from greater than 1 µm to 20 µm to the particles having a diameter ranging from 0.1 µm to 1.0 µm is between 10 to 200% by weight per 100% by weight of the particles having a diameter ranging from 0.1 µm to 1.0 µm.

10. The display sheet of claim 9, wherein the proportion is between 50 to 150% by weight.

11. The display sheet of claim 10, wherein the proportion is between 80 to 120% by weight.

12. The display sheet of claim 1, wherein the white pigment is chosen from the group comprising: anatase-type titanium oxide, rutile-type titanium oxide, lithopone, zinc white, white lead, or zinc sulfide.

13. The display sheet of claim 1, wherein the white pigment comprises non-magnetic particles.

14. The display sheet of claim 13, wherein the non-magnetic particles are 5.0 to 50.0% by weight, based on the weight of the liquid dispersion.

15. The display sheet of claim 14, wherein the non-magnetic particles are 10.0 to 40.0% by weight, based on the weight of the liquid dispersion.

16. The display sheet of claim 15, wherein the non-magnetic particles are 15.0 to 35.0% by weight, based on the weight of the liquid dispersion.

17. The display sheet of claim 13, wherein the non-magnetic particles have a diameter between 0.1 µm to 20 µm.

18. The display sheet of claim 17, wherein the non-magnetic particles have a diameter between 0.1 µm to 10 µm.

19. The display sheet of claim 18, wherein the non-magnetic particles have a diameter between 0.1 µm to 5 µm.

20. The display sheet of claim 19, wherein the non-magnetic particles have a diameter between 0.1 µm to 1.0 µm.

21. The display sheet of claim 5, wherein the proportion of the high-boiling solvent to the low-boiling solvent is 20 to 200 parts by weight per 100 parts by weight of the low-boiling solvent.

22. The display sheet of claim 21, wherein the proportion of the high-boiling solvent to the low-boiling solvent is 20 to 150 parts by weight per 100 parts by weight of the low-boiling solvent.

23. The display sheet of claim 22, wherein the proportion of the high-boiling solvent to the low-boiling solvent is 40 to 100 parts by weight per 100 parts by weight of the low-boiling solvent.

* * * * *